(No Model.)
J. A. STONE.
DRIVE CHAIN.
No. 393,491. Patented Nov. 27, 1888.
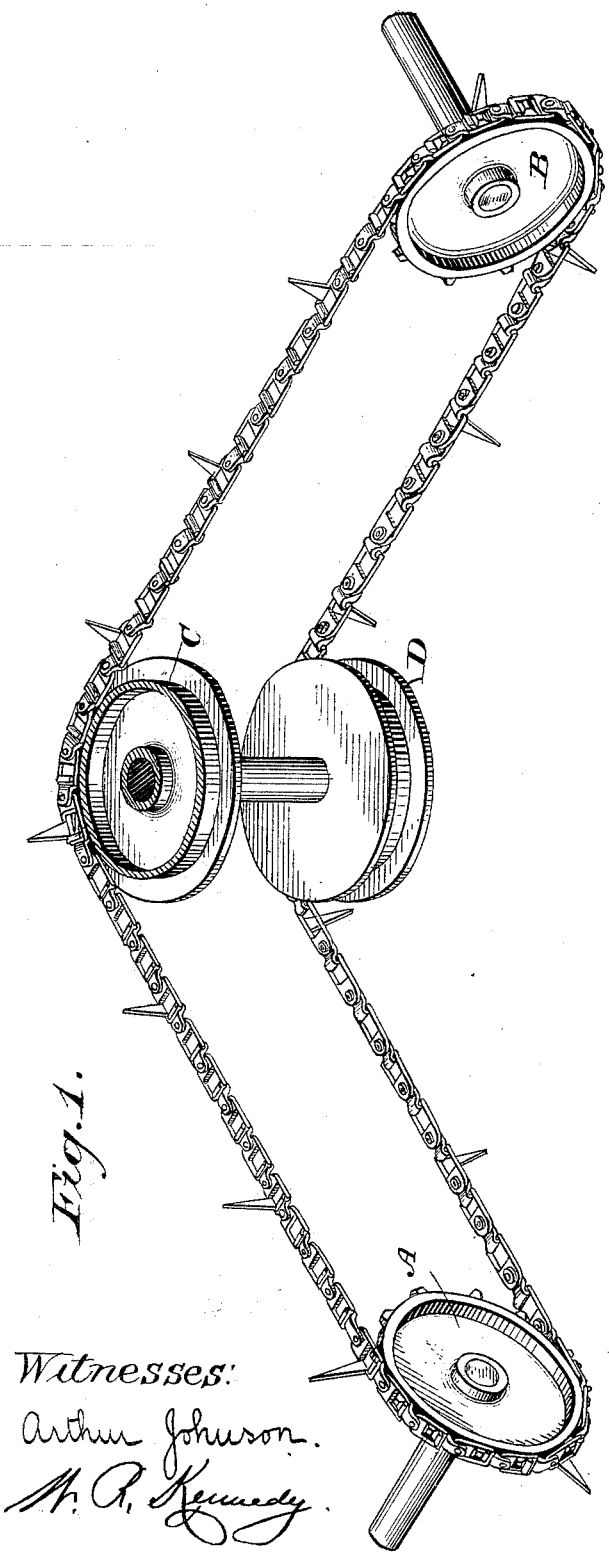
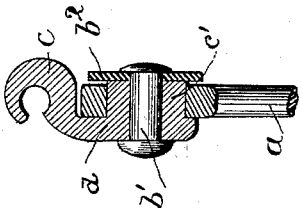
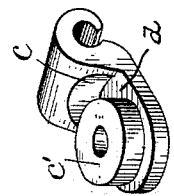
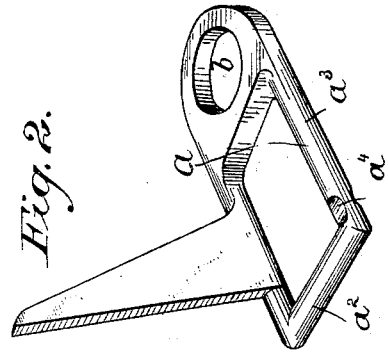
Witnesses:
Arthur Johnson
N. R. Kennedy
Inventor:
John A. Stone.
By his Atty.
P. T. Dodge

UNITED STATES PATENT OFFICE.

JOHN A. STONE, OF CHICAGO, ILLINOIS.

DRIVE-CHAIN.

SPECIFICATION forming part of Letters Patent No. 393,491, dated November 27, 1888.

Application filed September 25, 1888. Serial No. 286,338. (No model.)

*To all whom it may concern:*

Be it known that I, JOHN A. STONE, of the city of Chicago, county of Cook, and State of Illinois, have invented certain new and useful Improvements in Driving-Chains, of which the following is a full description, reference being had to the accompanying drawings, in which—

Figure 1 is a perspective view of my improved chain. Fig. 2 is a perspective view of the link. Fig. 3 is a perspective view of the coupling-hook. Fig. 4 is a sectional view of the link and coupling-hook.

The object of my invention is to provide a chain that can be thrown around wheels whose axes are not parallel; and it consists in connecting the links by doubly-jointed pieces.

$a$ is the link of the chain. Upon this is placed a spur in case the chain is to be used for carrying purposes. At one extremity of the link an end bar, $a^2$, is provided. A side bar, $a^3$, is provided with a depression, $a^4$, at its end, in order that the coupling-hook may be engaged. Other means for connecting the links may be used; but I prefer that form of coupling-chain now in common use and known as the "Ewart" chain. Upon the opposite end of the link I provide a circular opening, $b$.

$d$ is a connecting-hook, having a piece, $c'$, attached to pass into the eye $b$, where it may be secured by means of a rivet, $b'$, and burr $b^2$. The coupling-hook is thus jointed to the link upon the axes vertical to the plane of the latter. So constructed the links of the chain are de-
tachable and may be of any of the well-known forms.

In Fig. 1, A and B are sprocket-wheels, whose axes are at right angles to each other, and C and D are idle-wheels, around which the chain is brought. These wheels may, however, be used to drive some part of the mechanism, in which event, instead of sprockets, grooves will be made having projecting ribs upon the inner sides of the flanges, so as to permit the link $a$ to lie therein, yet so narrow that the coupling-hook cannot pass through them. It is obvious that the sprocket-wheels A and B are so placed that their axes will lie in any direction, yet substantially upon the same plane.

What I claim is—

1. In a drive-chain, the link $a$, having the end bar, $a^2$, at one end and the opening $b$ at the other, in combination with the hook $c$, having the boss $c'$, the said link and hook thereby jointed, whereby the link is provided with an axis vertical to the axis of the end bar, $a^2$, all combined substantially as described.

2. The chain-link $a$, provided with a tooth, and having the cylindrical end bar, $a^2$, at one end and the eye $b$ at the other end, in combination with the hook $c$, having the boss $c'$, adapted to become an axis substantially vertical to the plane of the link, substantially as described.

JOHN A. STONE.

Witnesses:
A. REDWANZ,
ARTHUR JOHNSON.